United States Patent
Tang et al.

(10) Patent No.: US 9,996,512 B2
(45) Date of Patent: Jun. 12, 2018

(54) CUSTOMIZED PROCESSING OF DOM OBJECTS

(71) Applicant: BEIJING QIHOO TECHNOLOGY COMPANY LIMITED, Beijing (CN)

(72) Inventors: Xi Tang, Beijing (CN); Zhi Chen, Beijing (CN); Ming Li, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 374 days.

(21) Appl. No.: 14/442,227

(22) PCT Filed: Sep. 18, 2013

(86) PCT No.: PCT/CN2013/083706
§ 371 (c)(1),
(2) Date: May 12, 2015

(87) PCT Pub. No.: WO2014/075509
PCT Pub. Date: May 22, 2014

(65) Prior Publication Data
US 2016/0154771 A1  Jun. 2, 2016

(30) Foreign Application Priority Data

Nov. 13, 2012  (CN) ........................ 2012 1 0454320
Nov. 13, 2012  (CN) ........................ 2012 1 0454661
Nov. 13, 2012  (CN) ........................ 2012 1 0454662

(51) Int. Cl.
*G06F 17/22*  (2006.01)
*G06F 17/30*  (2006.01)
(Continued)

(52) U.S. Cl.
CPC .......... *G06F 17/227* (2013.01); *G06F 3/0481* (2013.01); *G06F 17/2247* (2013.01);
(Continued)

(58) Field of Classification Search
None
See application file for complete search history.

(56) References Cited

U.S. PATENT DOCUMENTS 6,981,211 B1 * 12/2005 Claussen ........... G06F 17/30914
707/E17.012
6,981,212 B1 * 12/2005 Claussen ........... G06F 17/30896
707/E17.118
(Continued)

OTHER PUBLICATIONS

Qiu, Q. et al, English translation of Abstract only of Chinese Application No. CN101470742 A, Publication Date: Jul. 1, 2009, Title: Data system of personalized web page, display and data storage method, one page.
(Continued)

*Primary Examiner* — Asher D Kells
(74) *Attorney, Agent, or Firm* — Polsinelli PC

(57) ABSTRACT

The invention discloses a device for a browser to process a page element comprising: at least one DOM object processor disposed at the browser side, each DOM object processor being configured to store a customized processing of a specific DOM object; a page parser configured to load an obtained page at the browser side, parse page elements of the obtained page, and convert each page element into a DOM object; a DOM processor coupled to the page parser and the at least one DOM object processor, and configured to invoke the at least one DOM object processor to perform a customized processing on at least one of converted DOM objects. By employing the invention, a personalized customization can be performed to a page according to the user needs. The invention further discloses a corresponding method.

16 Claims, 7 Drawing Sheets

(51) Int. Cl.
    G06F 3/0481    (2013.01)
    G06F 17/24     (2006.01)
    G06F 17/27     (2006.01)

(52) U.S. Cl.
    CPC ............ *G06F 17/24* (2013.01); *G06F 17/272* (2013.01); *G06F 17/30896* (2013.01)

(56) References Cited

U.S. PATENT DOCUMENTS

| | | | | |
|---|---|---|---|---|
| 7,458,019 | B2 * | 11/2008 | Gumz | G06F 9/44526 707/999.101 |
| 8,719,451 | B1 * | 5/2014 | Colton | G06F 17/3089 709/248 |
| 9,064,028 | B2 * | 6/2015 | Shen | G06F 17/30905 |
| 2007/0101322 | A1 * | 5/2007 | Muschett | G06F 9/44526 717/168 |
| 2007/0266050 | A1 * | 11/2007 | Kaandorp | G06F 9/4445 |
| 2013/0254855 | A1 * | 9/2013 | Walters | G06F 21/60 726/5 |

OTHER PUBLICATIONS

Wang, G., English translation of Abstract only of Chinese Application No. CN101963984 A, Publication Date: Feb. 2, 2011, Title: Method and system for rendering page partial block, one page.

Dong, T., English translation of Abstract only of Chinese Application No. CN102214244 A, Publication Date: Oct. 12, 2011, Title: Analytic method and system for docx file information, one page.

Luo, X. et al, English translation of Abstract only of Chinese Application No. CN102665127 A, Publication Date: Sep. 12, 2012, Title: Browser system of digital television, one page.

Gao, Z. et al, English translation of Abstract only of Chinese Application No. CN102737128 A, Publication Date: Oct. 17, 2012, Title: Dynamic webpage processing method and device based on browser, one page.

Tang, X. et al, English translation of Abstract only of Chinese Application No. CN 102981844 A, Publication Date: Mar. 20, 2013, Title: Browser treating webpage main body element and method treating the webpage main body element, one page.

Tang, X. et al, English translation of Abstract only of Chinese Application No. CN102981848 A, Publication Date: Sep. 12, 2012, Title: Webpage main body element processing browser and method, one page.

Tang, X. et al, English translation of Abstract only of Chinese Application No. CN102999578 A, Publication Date: Mar. 27, 2013, Title: Method and device for processing page element, one page.

Tang, X. et al, English translation of Abstract only of Chinese Application No. CN102999579 A, Publication Date: Mar. 27, 2013, Title: Browser for processing page textbox, and method for processing page textbox element, one page.

Tang, X. et al, English translation of Abstract only of Chinese Application No. CN102999580 A, Publication Date: Mar. 27, 2013, Title: Code input frame element processing method and browser, one page.

Pan, C. et al, DOM-based method for Web information extraction, Silicon Valley, 2010, p. 172 & 190, vol. 20.

International Search Report regarding PCT/CN2013/083706 dated Dec. 26, 2013, 4 pages.

* cited by examiner

CUSTOMIZED PROCESSING OF DOM OBJECTS

FIELD OF THE INVENTION

The invention relates to the field of network application, and in particular, to a method and device for a browser to process a page element.

BACKGROUND OF THE INVENTION

With the rapid development of the internet, applications and information based on the internet also show explosive growth. A network browser provides an internet user with a way of accessing network information and using a network application, the applicability of such a way is strong, and more and more users have been used to obtaining various information and using a variety of applications via a network browser. A network information and application provider provides web pages written in a language of a format such as an HTML (Hypertext Markup Language), and a network browser presents these web pages at the user side, such that a user of the network browser may obtain relevant information. With the rapid development of network technologies, the content presented by the network browser is also more and more abundant, and therefore the presentation function of the network browser is also increasingly powerful and important. Nowadays, common web page browsers are Internet Explorer and Mozilla Firefox of Microsoft Corporation, Chrome and Opera of Google Corporation, and Safari of Apple Inc., etc.

In relevant techniques, a network browser utilizes a rendering engine to interpret content in a web page (e.g., HTML, JavaScript) and render (display) the web page. The rendering engine determines how the browser displays the content of the web page and the format information of a page. For a different rendering engine, the interpretation of the web page writing grammar is also different, and therefore the rendered (display) effects of one and the same web page in browsers with different rendering engines may also be different.

Currently, the rendering engine of a network browser conducts rendering by converting individual elements in an HTML and js codes into DOM models. In conversion, the entire HTML document is constructed as a DOM tree, the individual elements in the HTML are converted into objects in the DOM tree, whereas the relationship between the objects is constructed as a relationship between nodes and subnodes, and by using methods about objects, these object can be addressed and operated. The DOM model has already had many common specifications and definitions.

When a web page browser processes an HTML page, the rendering engine in the browser parses the HTML page language, processes it as a DOM model, and subsequently utilizes the DOM model to construct an internal structure for displaying the page in the browser. A DOM API further provides an interface for monitoring or modifying the web page to a js code.

The rendering engine introduces an event based mechanism to process a DOM object. Each DOM object has a plurality of associated events, and these events can be triggered. For example, the rendering engine analyzes a JS code in a web page, and associates the JS code with a corresponding event, such that when a specific event is triggered, a corresponding JS code is executed.

However, in a current web page browser, the rendering engine generally controls a corresponding DOM object only according to a JS code in an HTML web page, and therefore, when using the browser, it is difficult for a user to perform customized rendering on DOM objects, i.e., individual elements in the web page.

In summary, when presenting a web page, a present network browser generally presents the content of the web page according to a way required by a network application and information provider, and does not sufficiently consider the preference of a user for the page presentation way. Therefore, although existing network browsers have different rendering engines, their presentation effects are substantially the same, which makes it impossible for a user to perform sufficiently personalized customization on the content presented by the network browsers, and reduces the user's experience.

SUMMARY OF THE INVENTION

In view of the above problems, the invention is proposed to provide a device for a browser to process a page element, a corresponding method for a browser to process a page element and a corresponding program which can overcome the above problems or at least partly solve or mitigate the above problems.

According to an aspect of the invention, a device for a browser to process a page element is provided, which comprises: at least one DOM object processor disposed at the browser side, each DOM object processor being configured to store a customized processing of a specific DOM object; a page parser configured to load an obtained page at the browser side, parse page elements of the obtained page, and convert each page element into a DOM object; a DOM processor coupled to the page parser and the at least one DOM object processor, and configured to invoke at least one DOM object processor to perform a customized processing on at least one of converted DOM objects.

Correspondingly, the invention further provides a method for a browser to process a page element, at least one DOM object processor being disposed at the browser side, wherein each DOM object processor stores a customized processing of a specific DOM object, the method comprising: loading an obtained page at the browser side, parsing page elements of the obtained page, and converting each page element into a DOM object; and invoking the at least one DOM object processor to perform the customized processing on at least one of converted DOM objects.

According to another aspect of the invention, a computer program comprising a computer readable code is provided, which causes a user terminal to perform steps in the method for a browser to process a page element according to any of claims, when the computer readable code is running on the user terminal.

According to yet another aspect of the invention, a computer readable medium storing the computer program as claimed in the claims therein is provided.

The beneficial effects of the invention lie in that: in embodiments of the invention, for each DOM object, a DOM object processor for performing customized processing on it is disposed at the browser side, and in the procedure of obtaining a page, a DOM processor is utilized to invoke a selected DOM object processor to perform a customized processing on the DOM object. Thus, it can be seen that employing the device for a browser to process a page element provided by an embodiment of the invention, each DOM object can be processed respectively, the way of processing it is selected and invoked by a DOM processor, and therefore, a personalized customized processing can be implemented for the presented web page content, and it is not based on a fixed mode required by a network application and information provider, which in turn achieves a goal in which a user may perform personalized customization to the content presented by a network browser, meets different preferences of user and improves the user's experience.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. Therein.

DETAILED DESCRIPTION OF THE INVENTION

Figure 1:
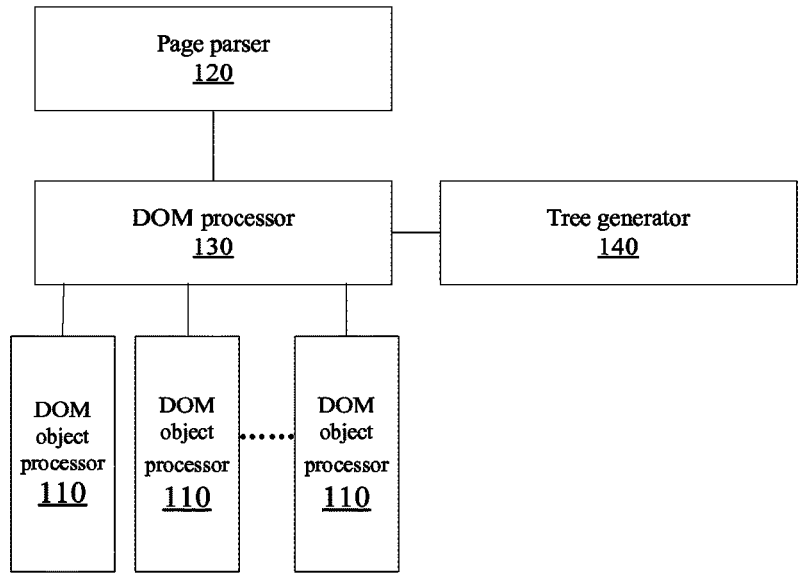
FIG. 1 shows schematically a structural schematic diagram of a device for a browser to process a page element according to an embodiment of the invention.

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

It is mentioned in the relevant techniques that when presenting a web page, a present network browser generally presents the content of the web page according to a way required by a network application and information provider, and does not sufficiently consider the preference of a user for the page presentation way. Therefore, although existing network browsers have different rendering engines, their presentation effects are substantially the same, which makes it impossible for a user to perform sufficiently personalized customization to the content presented by the network browsers, and reduces the user's experience.

To solve the above technical problem, an embodiment of the invention provides a device for a browser to process a page element for realizing an improved way of processing a web page element, and the device allows a user to perform personalized customization on the presentation way of a web page element, thereby enhancing the display effect of the page.

FIG. 1 shows schematically a structural schematic diagram of a device for a browser to process a page element of an embodiment of the invention. With reference to FIG. 1, the device comprises at least one DOM object processor 110 disposed at the browser side, a page parser 120 and a DOM processor 130.

Therein, there is comprised at least one DOM object processor 110, which is disposed at the browser side in advance, and each DOM object processor 110 stores a customized processing of a specific DOM object. The number of the DOM object processors may be 1, or also may be 2, or also may be 3, 4, 5 or more, and the specific number is determined according to the number of DOM objects and the number of customized processing. In FIG. 1, for illustration, the number is set to be 3.

When processing an obtained page, the page parser 120 loads the obtained page at the browser side, parses page elements of the obtained page. Considering that a page and a page element cannot be processed directly, therefore, the page parser 120 converts each page element into a DOM object during parsing for being processed by the DOM processor 130 subsequently.

Referring to FIG. 1, the DOM processor 130 is coupled to the page parser 120 and the at least DOM object processor 110. After the parsing of the page parser 120 finishes, the DOM processor 130 is started. The DOM processor 130 selects at least one of converted DOM objects as the DOM object currently prepared to be processed, invokes at least one DOM object processor 110 to perform a customized processing on the selected DOM object.

In an embodiment of the invention, for each DOM object, a DOM object processor for performing customized processing on it is disposed at the browser side, and in the procedure of obtaining a page, a DOM processor is utilized to invoke a selected DOM object processor to perform a customized processing on the DOM object. Thus, it can be seen that by employing the device for a browser to process a page element provided by an embodiment of the invention, each DOM object can be processed respectively, the way of processing it is selected and invoked by a DOM processor, and therefore, a personalized customized processing can be implemented for the presented web page content, and it is not based on a fixed mode required by a network application and information provider, which in turn achieves a goal in which a user can perform personalized customization to the content presented by a network browser, meets different preferences of a user and improves the user's experience.

With reference to FIG. 1, the device for a browser to process a web page element further comprises a tree generator 140 coupled to the DOM processor 130. After the DOM processor 130 invokes a DOM object processor 110 to perform a customized processing on a DOM object, the tree generator 140 utilizes the DOM object on which a set customized processing is performed to generate a final DOM tree and render the DOM tree.

Therein, for the operation of invoking a DOM object processor 110, the DOM processor 130 needs to know the address of each DOM object processor 110, and then performs a corresponding invocation, and if there are many DOM object processors and their memory addresses are relatively scattered, it will be difficult for the DOM processor 130 to invocate them. Now, a preferred way of invocation is provided. In this example, an object processing registry is set, the register information of all the DOM object processors is registered in this table, and the register information here may comprises memory addresses of each DOM object processor, the customization operation of each DOM object processor, and whether it is being invoked, etc. The DOM processor 130 can query in the object processing registry about whether there is a DOM object processor for processing a current DOM object. Optionally, if the query result is yes, the DOM processor 130 will find the DOM object processor 110 for processing the DOM object according to the register information and invoke it. Optionally, if the query result is no, then it demonstrates that currently there is not a DOM object processor 110 for processing the DOM object.

In the procedure of invocation, if the DOM processor 130 determines that in the browser there is a DOM object processor for processing the current DOM object, it invokes the DOM object processor to perform a customized processing on the DOM object. However, when the DOM processor 130 determines that in the browser there is not a DOM object processor for processing the current DOM object, it performs a default processing on the DOM object.

For each DOM object, there are at least two events, one is an event ContentReady triggered when the loading of the DOM object is finished, and the other is an event DocumentReady triggered when the loading of the whole HTML is finished. To customize a web page element, the concept of an embodiment of the invention is that: when the event ContentReady of a DOM object corresponding to the web page element is triggered, a customized processing preprogrammed at the web page browser is invoked, thereby realizing a customized processing of a specific web page element. Corresponding to this concept, each DOM object processor 110 stores a processing way of processing the event ContentReady triggered when the loading of a specific DOM object is finished. Further, since for a DOM object, there is also an event triggered when the loading of a full page is finished, each DOM object processor 110 may also store a processing way of processing the event DocumentReady triggered when the loading of the whole HTML of an obtained page is finished.

Since what is presented in the end is a complete web page, and whereas in the prior art the presentation of a web page is presented after rendered by a rendering engine, for convenience of the presentation of a page, the DOM processor provided by an embodiment of the invention is disposed in the rendering engine of the browser.

In the prior art, the rendering engine generally controls a corresponding DOM object only according to a JS code in an HTML web page, the rendering engine provides an interface to the JS code, whereas the JS code is generally controlled by a network application itself or a service provider, and therefore, the pages of web pages rendered by the rendering engine are similar. However, in this embodiment, the DOM processor 130 is capable of utilizing an interface provided by the browser for rendering a web page element to invoke the at least one DOM object processor 110, and through the interface, a personalized customization by a user can be realized.

Preferably, the DOM object mentioned in the above embodiments comprises a text box element, a password input box element. Of course, the DOM object does not only comprise these two elements, other web page elements may be equally implemented.

The architecture of each part of the above described device for a browser to process a page element is provided according to their functions, and a real architecture is not limited to the above parts, and may further comprise other parts, modules, appliances, etc.

Figure 2:
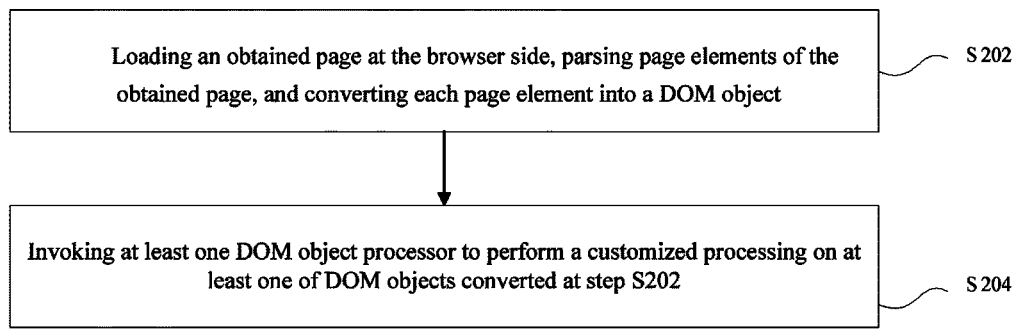
FIG. 2 shows schematically a flow chart of a method for a browser to process a page element according to an embodiment of the invention.

FIG. 2 shows schematically a flow chart of a method for a browser to process a page element according to an embodiment of the invention, at least one DOM object processor being disposed at the browser side, wherein each DOM object processor stores a customized processing of a specific DOM object. The processing flow of the method comprises step S202 to step S204.

At step S202, an obtained page is loaded at the browser side, page elements of the obtained page are parsed, and each page element is converted into a DOM object.

At step S204, the at least one DOM object processor is invoked to perform a customized processing on at least one of DOM objects converted in step S202.

In embodiments of the invention, for each DOM object, a DOM object processor for performing customized processing on it is disposed at the browser side, and in the procedure of obtaining a page, a selected DOM object processor is invoked to perform a customized processing on the DOM object. Thus, it can be seen that by employing the device for a browser to process a page element provided by an embodiment of the invention, each DOM object can be processed respectively, the way of processing it is selected and invoked according to a DOM object, and therefore, a personalized customized processing can be implemented for the presented web page content, and it is not based on a fixed mode required by a network application and information provider, which in turn achieves a goal in which a user can perform personalized customization to the content presented by a network browser, meets different preferences of a user and improves the user's experience.

Referring to the flow as shown in FIG. 2, after step S204 is implemented, DOM objects on which the customized processing are performed are utilized to generate a final DOM tree, the DOM tree is rendered, and the rendered web page is presented to a user.

At step S204, it is mentioned that at least one DOM object processor is invoked, and to complete the invocation, it is necessary to know the address of an object to be invoked (each DOM object processor), and thus a corresponding invocation can be performed. If there are many DOM object processors and their memory addresses are relatively scattered, it will be difficult for the DOM processor 130 to invocate them. Now, a preferred way of invocation is provided. In this example, an object processing registry is set, the register information of all the DOM object processors is registered in this table, and the register information here may comprises memory addresses of each DOM object processor, the customization operation of each DOM object processor, and whether it is being invoked, etc. For a specific invoking method thereof, it is referred to FIG. 3.

Figure 3:
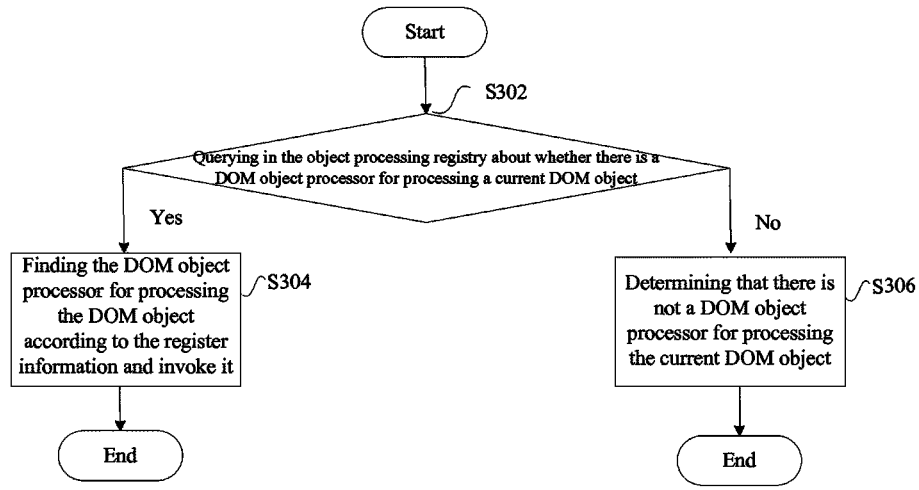
FIG. 3 shows schematically a flow chart of a query of a DOM object processor according to an embodiment of the invention.

FIG. 3 shows schematically a flow chart of a method for invoking a DOM object processor according to an embodiment of the invention. Referring to FIG. 3, the method comprises step S302 to step S306.

At step S302, it is queried in the object processing registry about whether there is a DOM object processor for processing a current DOM object.

At step S304, when the query result in step S302 is yes, the DOM object processor for processing the DOM object is found according to the registered information and invoked.

At step S306, when the query result at step S302 is no, it is determined that there is not a DOM object processor for processing the current DOM object.

In the procedure of invocation, when there is a DOM object processor for processing the current DOM object in the browser, the DOM object processor is invoked to perform a customized processing on the DOM object. However, when there is not a DOM object processor for processing the current DOM object in the browser, a default processing is directly performed on the DOM object.

For each DOM object, there are at least two events, one is an event ContentReady triggered when the loading of the DOM object is finished, and the other is an event DocumentReady triggered when the loading of the whole HTML is finished. To customize a web page element, the concept of an embodiment of the invention is that: when the event ContentReady of a DOM object corresponding to the web page element is triggered, a customized processing preprogrammed at the web page browser is invoked, thereby realizing a customized processing of a specific web page element. Corresponding to this concept, each DOM object processor stores a processing way of processing the event ContentReady triggered when the loading of a specific DOM object is finished. Further, since for a DOM object, there is also an event triggered when the loading of a full page is finished, each DOM object processor may also store a processing way of processing the event DocumentReady triggered when the loading of the whole HTML of an obtained page is finished.

In the prior art, the rendering engine generally controls a corresponding DOM object only according to a JS code in an HTML web page, the rendering engine provides an interface to the JS code, whereas the JS code is generally controlled by a network application itself or a service provider, and therefore, the pages of web pages rendered by the rendering engine are similar. However, in this embodiment, the browser provides an interface capable of rendering a web page element, and utilizes the interface to invoke at least one DOM object processor, thus realizes a personalized customization by a user.

First Embodiment

For the browser mentioned in the embodiments of the invention, there are many kinds, for example, Internet Explorer (IE for short) and Mozilla Firefox of Microsoft Corporation, Chrome and Opera of Google Corporation, and Safari of Apple Inc., etc.

Now, the browser IE is taken as an example to set forth and illustrate in detail a specific method for processing a web page element provided by an embodiment of the invention.

When the browser is the browser IE, a client where the browser is located disposes a first interface IElementBehaviorFactory, a second interface IElementBehavior and a third interface IDocHostUIHandler in the plug-in WebBrowser, wherein the first interface and the second interface are configured to invoke each DOM object processor, and the third interface is configured to register each DOM object processor into the object processing registry.

For a specific processing with respect to each web page element, the following may be required to be implemented:
IElementBehavior (element behavior)
Implementing the IElementBehavior Interface (interface for implementing an element behavior)
Implementing the Notify Method (method for implementing a notification)
Implementing the Init Method (method for implementing initialization)
Implementing the Detach Method (method for implementing detachment)
IElementBehaviorFactory (element behavior factory behavior)
IElementNamespaceFactory (element namespace factory interface)
IElementNamespaceFactoryCallback (element namespace callback interface)

After an initialization is set, the specific steps for processing a web page element implemented by the client plug-in WebBrowser (a network browser) in the browser IE are as follows.

At step 1, the client plug-in WebBrowser implements the interface IElementBehaviorFactory and the interface IElementBehavior.

At step 2, the client plug-in WebBrowser implements the interface IDocHostUIHandler.

Note that the plug-in WebBrowser here is a particular implementation of the specific processor with respect to the specific DOM object in IE, implements the interface IDocHostUIHandler for registering the specific processor into the object registry for being employed by the DOM processor, and implements the interfaces IElementBehaviorFactory and IElementBehavior for illustrating the implementation of a particular customized processing.

At step 3, when a page is created, MSHTML will invoke the GetHostInfo method of IDocHostUIHandler, and a client program will provide a TAG of a page element and a corresponding Behavior Name to MSHTML. Note: MSHTML corresponds to a core engine, and this step corresponds to the DOM processor querying a list of all the DOM object processors.

At step 4, when a page is loaded, MSHTML will, according to the Behavior Name provided above, invoke the FindBehavior method of IElementBehaviorFactory one by one, which is implemented by the interface IElementBehavior provided by the client. Here, preferably, it is associated with a corresponding interface IElementBehaviorSite provided by the page to determine whether it is a customized behavior.

At step 5, if the client provides an implementation of IElementBehavior, when loading a page element corresponding to TAG, MSHTML will invoke the element behavior notification method to notify the client of the loaded state of the page element. Note: the implementation of the element behavior notification method in IE may utilize IElementBehavior::Notify.

Therein, it is worth noting that step 4 and step 5 correspond to the DOM processor invoking a corresponding DOM object processor to process a DOM object.

The method of the embodiment is not limited to the browser IE, and for other browsers, the implementations thereof are similar.

Preferably, the DOM object mentioned in the above each embodiment comprises a text box element, a password input box element. Of course, the DOM object does not only comprise these two elements, and other web page elements may be equally implemented. Now, a text box element is taken as an example for illustration.

Second Embodiment

For the page unit Textarea (a text box), it provides a user with an input box for inputting a large number of characters in a web page, however, in a current way of presenting a web page, the user can only input simple characters in the textarea, and cannot input content such as characters, images, etc. in a predetermined format. However, by providing customized rendering of the textarea at the browser, it is enabled to input richer content in the textarea.

In this example, a corresponding description will be provided for specific operations of a text box element.

1. First, a definition is performed on an event. In the GetHostInfo method of IDocHostUIHandler, the structure and identification of the browser are customized. A div layer is disposed on the text box element, and pCSSBuffer pointer dispatch is utilized to pull operations involving the text box element onto the div layer for execution.

2. In the FindBehavior method of IElementBehaviorFactory, the implemented object CTextAreaElementBehavior of IElementBehavior is returned, and the IElementBehaviorSite object pointer provided by MSHTML is saved.

3. When MSHTML invokes the text box element behavior notification (CTextAreaElementBehavior::Notify) method, the operations involving the text box element are implemented.

When the text box element corresponding to TAG is loaded, the element behavior notification method is invoked to notify the client of the loaded state of the text box element. The content in the text box element is processed at the div layer, and the processing involves adjusting the width, height, and playback effect, etc. of the content of the text box element.

After the processing at the div layer is finished, the content of the text box element and the processing effect at the div layer are overlapped, and the overlapped effect is presented to the user.

Using the embodiment of the invention can realize the method for utilizing a browser to process a page element (text box element), realize personalized customization by a user and improve the experience of the user.

Employing the device and method provided by the invention, the following beneficial effects may be achieved.

In embodiments of the invention, for each DOM object, a DOM object processor for performing customized processing on it is disposed at the browser side, and in the procedure of obtaining a page, a DOM processor is utilized to invoke a selected DOM object processor to perform a customized processing on the DOM object. Thus, it can be seen that employing the device for a browser to process a page element provided by an embodiment of the invention, each DOM object can be processed respectively, the way of processing it is selected and invoked by a DOM processor, and therefore, a personalized customized processing can be implemented for the presented web page content, and it is not based on a fixed mode required by a network application and information provider, which in turn achieves a goal in which a user may perform personalized customization to the content presented by a network browser, meets different preferences of user and improves the user's experience.

In the above described embodiment of the invention, the page element can be a text area input box element. The following embodiments will be disclosed taking such a text area input box element as an example. In an embodiment of the invention, a DOM object processing module is provided for a text box element, and each object processing module stores a customized processing for its corresponding text box element.

It is mentioned in the relevant techniques that the display ways for characters in a text area input box are consistent, it is difficult to specify different fonts for different characters, and it is also difficult to input multimedia information similar to a table, an image and audio, etc. in a text box. Therefore, currently, it is needed to improve the presentation and processing ways of the textarea so as to provide richer input and presentation ways.

Since a text box element is presented in a browser, an embodiment of the invention provides a browser capable of processing a page text box and utilizes the browser to improve the presentation and processing ways of a text box element. In this example, the processing way of a text box element is changed, a DOM object processing module is provided for a text box element, and each object processing module stores a customized processing for its corresponding text box element. When implemented, a text box element can be processed in different customized processing ways, thereby realizing rich input and presentation ways of a text box element.

Figure 4:
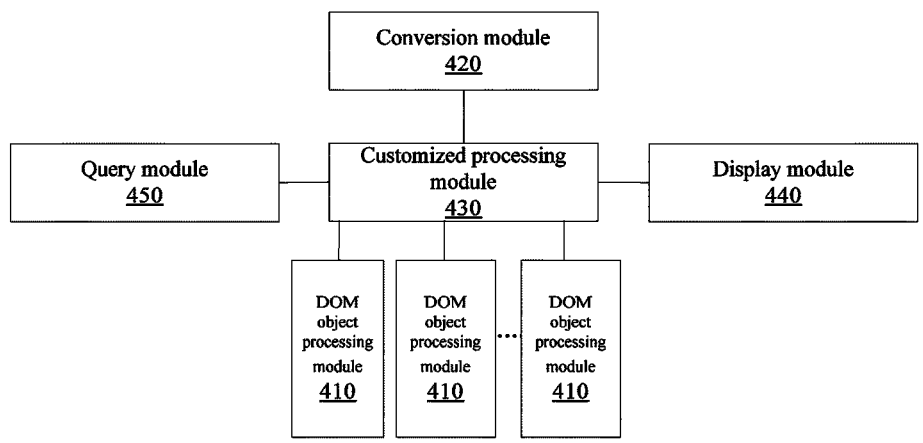
FIG. 4 shows schematically a structural schematic diagram of a browser for processing a page text box according to an embodiment of the invention.

FIG. 4 shows schematically a structural schematic diagram of a browser for processing a page text box according to an embodiment of the invention. The browser comprises at least one DOM object processing module 410 of a text box element, a conversion module 420, a customized processing module 430 and a display module 440.

Therein, there is comprised at least one DOM object processing module 410, and it is disposed at the browser side beforehand in advance, and each DOM object processing module 410 stores a customized processing of a text box element. The number of the DOM object processing modules may be 1, or also may be 2, or also may be 3, 4, 5, or more, and the specific number is determined according to the number of DOM objects and the number of customized processing. In FIG. 4, it is set to be 3 for illustration.

When processing an obtained page, the conversion module 420 first loads the obtained page at the browser side. Considering that a page as well as a page element can not be directly processed, therefore, the conversion module 420 parses a text box element in the obtained page and converts the text box element into a DOM object for being subsequently processed by the customized processing module 430.

Referring to FIG. 4, the customized processing module 430 is coupled to the conversion module 420 and the at least one DOM object processing module 410 of a text box element pre-disposed at the browser. After the parsing and conversion operations for a text box element are finished, the conversion module 420 will invoke the at least one DOM object processing module 410 of a text box element to perform a customized processing on the least one text box element in converted DOM objects.

Therein, the display module 440 is coupled to the customized processing module 430. After the customized processing operation of the customized processing module 430 is finished, the display module 440 displays the customized processing result in the text box element of the obtained page.

In the embodiment of the invention, for each DOM object parsed from a text box element, a DOM object processing module for performing a customized processing on it is disposed at the network side, and in the procedure of obtaining a page, an invoked DOM object processing module is utilized to perform a customized processing on the DOM object. Since the at least one DOM object processing module can store at least one customized processing way, so it can perform at least one processing on the text box element, and in turn different elements in the text box element may be adjusted to present in different states. Thus, it can be seen that by employing the browser for processing a page text box provided by the embodiment of the invention, different DOM objects in a text box element can be processed respectively, and therefore, a personalized customized processing can be implemented for the presented text box element. For example, for different characters, different fonts can be specified and different colors can be presented. For another example, multimedia information similar to a table, an image and audio-video, etc. can be inputted in a text box element. It is guaranteed that the text box element is not based on a fixed mode required by a network application and information provider, which in turn achieves a goal in which a user may perform personalized customization to the content presented by a text box element, meets different preferences of user and improves the user's experience.

It is mentioned above that the customized processing module 430 can invoke at least one DOM object processing module 410 of a text box element. Preferably, the customized processing module 430 first obtains the position information of a text box element on a browser page from a converted DOM object. Further, the customized processing module 430 can generate an overlapped block level layer on the text box element according to the obtained position information. Subsequently, on the overlapped block level layer, the customized processing module 430 invokes at least one set DOM object processing module 410 of a text box element to perform a customized processing on the at least one text box element in converted DOM objects. After the overlapped block level layer is set, customized processing of the text box element is performed on the block level layer, but not performed on the text box element itself, which not only protects the originality and authenticity of the text box element itself, but also can correspondingly process the text box element, such that its presentation effect can meet the user's personalized customization.

When the customized processing module 430 performs a customized processing on the text box element on the overlapped block level layer, the display module 440 can display the customized processing result on the block level layer located on the text box element of the obtained page.

Preferably, when the block level layer provided by the embodiment of the invention comprises a div layer, the display module 440 obtains from the customized processing module 430 the content information generated after a customized processing is performed on the text box element, decodes the content information and displays the decoded content information on the div layer.

Therein, for the operation of invoking a DOM object processing module 410, the customized processing module 430 needs to know the address of each DOM object processing module 410, and then performs a corresponding invocation, and if there are many DOM object processing modules and their memory addresses are relatively scattered, it will be difficult for the customized processing module 430 to invoke. Now, a preferred way of invocation is provided. In this example, an object processing registry is set, the register information of all the DOM object processing modules is registered in this table, and the register information here may comprises memory addresses of each DOM object processing modules, the customization operation of each DOM object processing module, and whether it is being invoked, etc. Correspondingly, referring to FIG. 4, the browser for processing a page text box provided by the embodiment of the invention further comprises a query module 460. The query module 460 is coupled to the customized processing module 430 and queries from the object processing registry about whether there is a DOM object processing module for processing a text box element in the browser. After the query is finished, the query module 460 notifies the customized processing module 430 of the query result, and the customized processing module 430 will invoke a corresponding DOM object processing module 410 according to the query result.

For each DOM object, there are at least two events, one is an event ContentReady triggered when the loading of the DOM object is finished, and the other is an event DocumentReady triggered when the loading of the whole HTML is finished. Since the embodiment of the invention simply processes a text box element, it only involves the event ContentReady triggered when the loading of the DOM object is finished. Preferably, the at least DOM object processing module provided by the embodiment of the invention stores a processing way which specifies a processing of the event ContentReady triggered when the loading of the text box element is finished.

Each DOM object processing module stores different customized processing ways for a text box element, and the stored processing ways here may be any processing ways capable of processing a text box element, for example, the processing way may be about fonts, or about images, etc. Preferably, the processing way may be to set different fonts, colors, shades, text blocks, etc. for different characters in a text box element, or to input a table in a text box element, or to input an image in a text box element, or to input multimedia information in a text box element. Therein, the multimedia information comprises audio and/or video. The processing ways provided in this example can be used singly, or used in combination. Moreover, the processing ways provided in this example are just illustrative, the processing ways are not limited to those provided in this example, and any processing way capable of processing a text box element will do.

Now, a case when an overlapped block level layer comprises a div layer will be set forth and illustrated in detail in a specific embodiment.

For the textarea, a rendering engine of a web page browser comprises a specific processor (i.e., a DOM object processing module) for the textarea, and the specific processor at least specifies a processing method for processing the event ContentReady triggered when the loading of a DOM object is finished.

When implemented, the customized processing module 430 first obtains the position information of the textarea. Then, the customized processing module 430 overlaps a div layer on the area of the textarea, and sets various attributes of the div layer. Since the div layer is overlapped on the textarea, the div layer receives an interaction event beforehand and processes it. Further, the display module 440 obtains the content in the textarea, decodes the content of the textarea and displays it on the div layer.

Preferably, the customized processing module 430 invokes the attribute innerText of a text box element, invokes at least one set DOM object processing module 410 of a text box element to redefine the attribute innerText, and returns the redefined attribute innerHTML of the text box element to the div layer. Therein, the redefinition operation in this example comprises a processing way of onblur or onSubmit.

The architecture of each part of the above described browser for processing a page text box is provided according to their functions, and a real architecture is not limited to the above parts, and may further comprise other parts, modules, appliances, etc.

Figure 5:
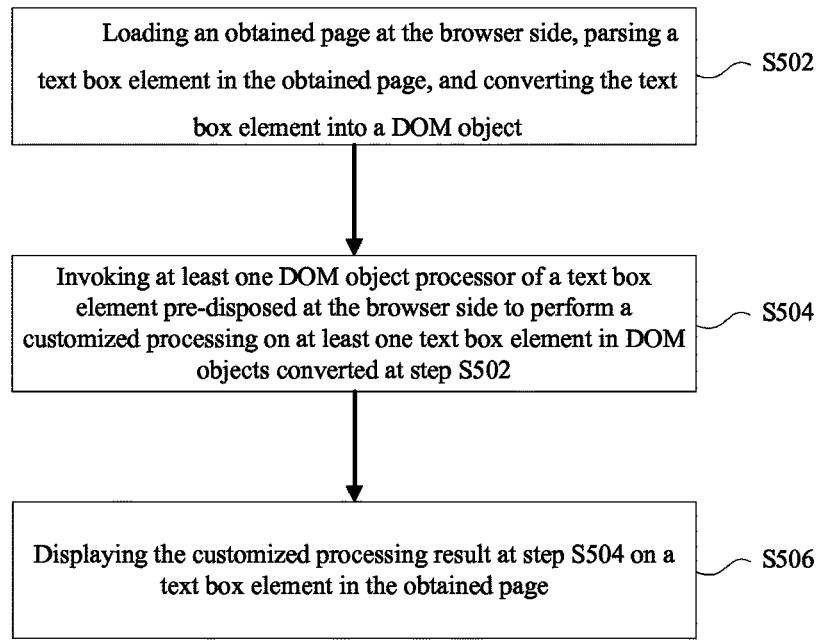
FIG. 5 shows schematically a processing flow chart of a method for a browser to process a page text box according to an embodiment of the invention.

FIG. 5 shows schematically a processing flow chart of a method for a browser to process a page text box according to an embodiment of the invention. In this example, at least one DOM object processor of a text box element is disposed at the browser side, wherein each object processor stores a customized processing of a text box element. The method comprises step S502 to step S506.

At step S502, an obtained page is loaded at the browser side, a text box element in the obtained page is parsed, and the text box element is converted into a DOM object.

At step S504, at least one DOM object processor of a text box element pre-disposed at the browser side is invoked to perform a customized processing on at least one text box element in DOM objects converted at step S502.

At step S506, the customized processing result in step S504 is displayed on a text box element in the obtained page.

In the embodiment of the invention, for each DOM object parsed from a text box element, a DOM object processor for performing a customized processing on it is disposed at the network side, and in the procedure of obtaining a page, an invoked DOM object processor is utilized to perform a customized processing on the DOM object. Since at least one DOM object processor can store at least one customized processing way, at least one processing can be performed to the text box element, and in turn different elements in the text box element may be adjusted to present in different states. Thus, it can be seen that by employing the method for a browser to process a page text box provided by the embodiment of the invention, different DOM objects in a text box element can be processed respectively, and therefore, a personalized customized processing can be implemented for the presented text box element. For example, for different characters, different fonts can be specified and different colors can be presented. For another example, multimedia information similar to a table, an image and audio-video, etc. can be inputted in a text box element. It is guaranteed that the text box element is not based on a fixed mode required by a network application and information provider, which in turn achieves a goal in which a user may perform personalized customization to the content presented by a text box element, meets different preferences of user and improves the user's experience.

The function of the DOM object processor in this flow is similar to that of the DOM object processing module mentioned above, and since the above is related to the architecture of a browser, it is referred to as a DOM object processing module. However, in this flow, only one component, i.e., the DOM object processor, is involved, and therefore, it is not needed to be called a module, which will not be repeated hereinafter.

Figure 6:
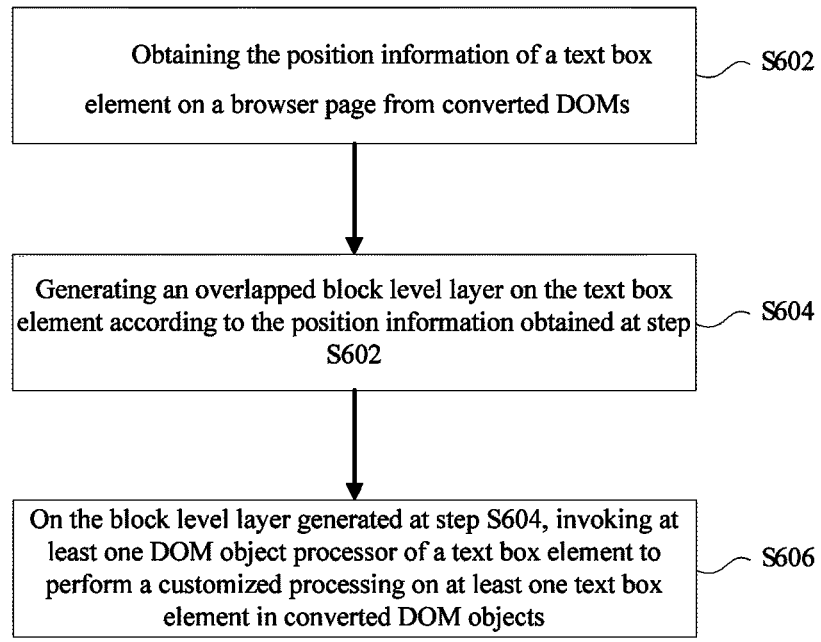
FIG. 6 shows schematically a processing flow chart of performing a customized processing on a block level layer according to an embodiment of the invention.

Referring to FIG. 5, when step S504 is implemented, it is mentioned that at least one set DOM object processor of a text box element is invoked to perform a customized processing on at least one text box element in converted DOM objects. In a preferred embodiment, an overlapped block level layer is disposed on a text box element, and the corresponding processing is performed on the block level layer. FIG. 6 shows schematically a processing flow chart for performing a customized processing on a block level layer according to an embodiment of the invention. The processing flow comprises step S602 to step S606.

At step S602, the position information of a text box element on a browser page is obtained from converted DOMs.

At step S604, an overlapped block level layer is generated on the text box element according to the position information obtained at step S602.

At step S606, on the block level layer generated at step S604, at least one set DOM object processor of a text box element is invoked to perform a customized processing on at least one text box element in converted DOM objects.

After a customized processing is performed on the block level layer, correspondingly, it is necessarily possible to display the customized processing result on the block level layer located on the text box element of the obtained page.

The block level layer may be any layer which can be disposed on a text box element and also can process the text box element. When the block level layer is a div layer, to display the customized processing result on the text box element in the obtained page, first the content information generated after a customized processing is performed on the text box element is obtained. After the obtaining of the content information is finished, the content information is decoded and the decoded content information is displayed on the div layer.

Therein, for the operation of invoking a DOM object processor, it is needed to know the address of each DOM object processor, and then a corresponding invocation is performed, and if there are many DOM object processors and their memory addresses are relatively scattered, it will be difficult for the invocation. Now, a preferred way of invocation is provided. In this example, an object processing registry is set, the register information of all the DOM object processors is registered in this table, and the register information here may comprises memory addresses of each DOM object processor, the customization operation of each DOM object processor, and whether it is being invoked, etc. Correspondingly, before the invocation operation at step S504 is performed, whether in the browser there is a DOM object processor for processing a text box element can be queried in the object processing registry, and then the invocation is performed according to the query result.

For each DOM object, there are at least two events, one is an event ContentReady triggered when the loading of the DOM object is finished, and the other is an event DocumentReady triggered when the loading of the whole HTML is finished. Since the embodiment of the invention simply processes a text box element, it only involves the event ContentReady triggered when the loading of the DOM object is finished. Preferably, the at least DOM object processor provided by the embodiment of the invention stores a processing way which specifies a processing of the event ContentReady triggered when the loading of the text box element is finished.

Each DOM object processor stores different customized processing ways for a text box element, and the stored processing ways here may be any processing ways capable of processing a text box element, for example, the processing way may be about fonts, or about images, etc. Preferably, the processing way may be to set different fonts, colors, shades, text blocks, etc. for different characters in a text box element, or to input a table in a text box element, or to input an image in a text box element, or to input multimedia information in a text box element. Therein, the multimedia information comprises audio and/or video. The processing ways provided in this example can be used singly, or used in combination. Moreover, the processing ways provided in this example are just illustrative, the processing ways are not limited to those provided in this example, and any processing way capable of processing a text box element will do.

Preferably, the invocation operation involved at step S504 particularly comprises: invoking the attribute innerText of a text box element, invoking at least one DOM object processing module 410 of a text box element to redefine the attribute innerText, and returns the redefined attribute innerHTML of the text box element to the div layer. Therein, the redefinition operation in this example comprises a processing way of onblur or onSubmit.

First Embodiment

For the browser mentioned in the embodiments of the invention, there are many kinds, for example, Internet Explorer (IE for short) and Mozilla Firefox of Microsoft Corporation, Chrome and Opera of Google Corporation, and Safari of Apple Inc., etc.

Now, the browser IE is taken as an example to set forth and illustrate in detail a specific method for processing a text box element provided by an embodiment of the invention.

For a specific processing with respect to each web page element, the following may be required to be implemented:
IElementBehavior (element behavior)
Implementing the IElementBehavior Interface (interface for implementing an element behavior)
Implementing the Notify Method (method for implementing a notification)
Implementing the Init Method (method for implementing initialization)
Implementing the Detach Method (method for implementing detachment)
IElementBehaviorFactory (element behavior factory behavior)
IElementNamespaceFactory (element namespace factory interface)
IElementNamespaceFactoryCallback (element namespace callback interface)

After an initialization is set, the specific steps for processing a web page element implemented by the client plug-in WebBrowser (a network browser) in the browser IE are as follows.

At step 1, the client plug-in WebBrowser implements the interface IElementBehaviorFactory and the interface IElementBehavior.

At step 2, the client plug-in WebBrowser implements the interface IDocHostUIHandler.

Note that the plug-in WebBrowser here is a particular implementation of the specific processor with respect to a specific DOM object in IE, implements the interface IDocHostUIHandler for registering the specific processor into the object registry for being employed by the DOM processor, and implements the interfaces IElementBehaviorFactory and IElementBehavior for illustrating the implementation of a particular customized processing.

At step 3, when a page is created, MSHTML will invoke the GetHostInfo method of IDocHostUIHandler, and a client program will provide a TAG of a page element and a corresponding Behavior Name to MSHTML.

Note: MSHTML corresponds to a core engine, and this step corresponds to the DOM processor querying a list of all the DOM object processors.

At step 4, when a page is loaded, MSHTML will, according to the Behavior Name provided above, invoke the FindBehavior method of IElementBehaviorFactory one by one, which is implemented by the interface IElementBehavior provided by the client.

Here, preferably, it is associated with a corresponding interface IElementBehaviorSite provided by the page to determine whether it is a customized behavior.

At step 5, if the client provides an implementation of IElementBehavior, when loading a page element corresponding to TAG, MSHTML will invoke the element behavior notification method to notify the client of the loaded state of the page element.

Note: the implementation of the element behavior notification method in IE may utilize IElementBehavior::Notify.

Therein, it is worth noting that step 4 and step 5 correspond to the customized processing module invoking a corresponding DOM object processor to process a DOM object.

The method of the embodiment is not limited to the browser IE, and for other browsers, the implementations thereof are similar.

Second Embodiment

For the page unit Textarea (a text box), it provides a user with an input box for inputting a large number of characters in a web page, however, in a current way of presenting a web page, the user can only input simple characters in the textarea, and can not input content such as characters, images, etc. in a predetermined format. However, by providing customized rendering of the textarea at the browser, it is enabled to input richer content in the textarea.

In this example, a corresponding description will be provided for specific operations of a text box element.

1. First, a definition is performed on an event. In the GetHostInfo method of IDocHostUIHandler, the structure and identification of the browser are customized A div layer is disposed on the text box element, and pCSSBuffer pointer dispatch is utilized to pull operations involving the text box element onto the div layer for execution.

2. In the FindBehavior method of IElementBehaviorFactory, the implemented object CTextAreaElementBehavior of IElementBehavior is returned, and the IElementBehaviorSite object pointer provided by MSHTML is saved.

3. When MSHTML invokes the text box element behavior notification (CTextAreaElementBehavior::Notify) method, the operations involving the text box element are implemented.

When the text box element corresponding to TAG is loaded, the element behavior notification method is invoked to notify the client of the loaded state of the text box element. The content in the text box element is processed at the div layer, and the processing involves adjusting the width, height, and playback effect, etc. of the content of the text box element.

When a page submits the content of the textArea, the attribute innerText of the textArea will be invoked and redefined, and the coded innerHTML of the div will be returned.

After the processing at the div layer is finished, the content of the text box element and the processing effect at the div layer are overlapped, and the overlapped effect is presented to the user.

Using the embodiment of the invention can realize the method for utilizing a browser to process a text box element, realize personalized customization by a user and improve the experience of the user.

Third Embodiment

What is described above is to directly process a text box element. As is well known, there are many kinds of page elements, the browser needs to convert and process each page element, and then render the processed page element so as to generate a presented web page.

Figure 7:
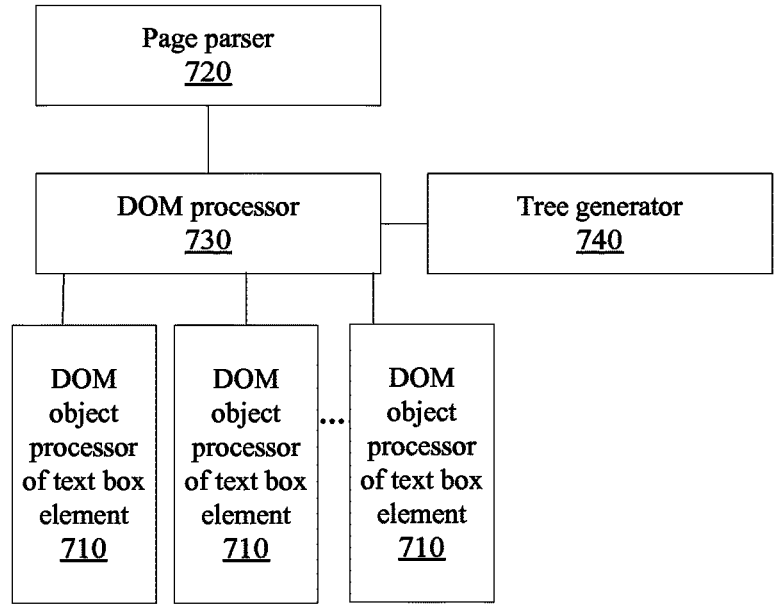
FIG. 7 shows schematically a structural schematic diagram of a browser for processing a page text box according to an embodiment of the invention.

FIG. 7 shows schematically a structural schematic diagram of a browser for processing a page element according to an embodiment of the invention. Referring to FIG. 7, the browser comprises at least one DOM object processor 710 disposed at the browser side, a page parser 720 and a DOM processor 730.

Therein, there is comprised at least one DOM object processor 710, which is disposed at the browser side in advance, and each DOM object processor 710 stores a customized processing of a specific DOM object. The number of the DOM object processors may be 1, or also may be 2, or also may be 3, 4, 5 or more, and the specific number is determined according to the number of DOM objects and the number of customized processing. In FIG. 7, for illustration, the number is set to be 3.

When processing an obtained page, the page parser 720 loads the obtained page at the browser side, parses page elements of the obtained page. Considering that a page and a page element can not be processed directly, therefore, the page parser 720 converts each page element into a DOM object during parsing for being processed by the DOM processor 730 subsequently.

Referring to FIG. 7, the DOM processor 730 is coupled to the page parser 720 and the at least DOM object processor 710. After the parsing of the page parser 720 finishes, the DOM processor 730 is started. The DOM processor 730 selects at least one of converted DOM objects as the DOM object currently prepared to be processed, invokes at least one DOM object processor 710 to perform a customized processing on the selected DOM object.

Referring to FIG. 7, the browser further comprises a tree generator 740 coupled to the DOM processor 730. After the DOM processor 730 invokes a DOM object processor 710 to perform a customized processing on a DOM object, the tree generator 740 utilizes the DOM object on which a set customized processing is performed to generate a final DOM tree and render the DOM tree.

However, the text box element is one of the page elements, and therefore, when the page element is a text box element, a device for utilizing a browser to process a page element can directly process the text box element, only the customized processing way stored in the selected DOM object processor is directed to a customized processing of a text box element. That is, in this example, referring to FIG. 7, the selected DOM object processor 710 should be a DOM object processor 710 of a text box element. The functions of other components remain unchanged.

In this example, the function of the page parser 720 is similar to that of the conversion module 420 in a previous embodiment, and both functions are to convert a corresponding element into a DOM object. And the DOM processor 730 is similar to the customized processing module 430 in the previous embodiment in terms of function, which invokes a corresponding DOM object processing module (or a DOM object processor) to perform a corresponding processing on a current DOM object.

Employing the browser provided by the invention and its corresponding processing method, the following beneficial effects can be achieved:

In the embodiment of the invention, for each DOM object parsed from a text box element, a DOM object processing module for performing a customized processing on it is disposed at the network side, and in the procedure of obtaining a page, an invoked DOM object processing module is utilized to perform a customized processing on the DOM object. Since at least one DOM object processing module can store at least one customized processing way, at least one processing can be performed to the text box element, and in turn different elements in the text box element may be adjusted to present in different states. Thus, it can be seen that by employing the browser for processing a page text box provided by the embodiment of the invention, different DOM objects in a text box element can be processed respectively, and therefore, a personalized customized processing can be implemented for the presented text box element. For example, for different characters, different fonts can be specified and different colors can be presented. For another example, multimedia information similar to a table, an image and audio-video, etc. can be inputted in a text box element. The embodiment of the invention provides improved presentation and processing ways for the traditional textarea, increases the interaction performance of a page, and guarantees that the text box element is not based on a fixed mode required by a network application and information provider, which in turn achieves a goal in which a user may perform personalized customization to the content presented by a text box element, meets different preferences of user and improves the user's experience.

In the foregoing embodiment of the invention, the text area input box element may be a password input box element. The following embodiments will be disclosed taking such a password input box element as an example. In embodiments of the invention, for a DOM object of a parsed password input box element, a DOM object processing module for performing a customized processing on it is disposed at the network side, and in the procedure of obtaining a page, an invoked DOM object processing module is utilized to perform a customized processing on a DOM object of a password input box element, so as to prevent various malicious programs from intercepting a password and improve the security of the system.

It is mentioned in the prior art that to obtain a user's password, a lot of malicious software and Trojans, etc. will specially monitor a password input box in a web page, and intercept a password of a user when the user is inputting the password into the password input box, thereby leading to the user's password, etc. being stolen. Although an existing web page browser can display in a hidden way the content that a user inputs into a password input box, it cannot prevent various malicious programs from intercepting a password. Therefore, it is needed to improve the presentation and processing ways of a password input box, in order to provide a more secure way.

Figure 8:
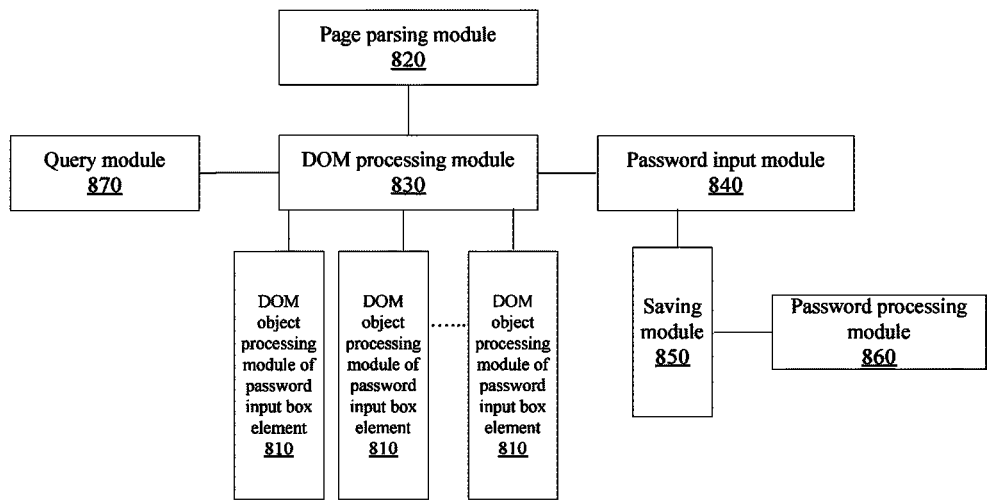
FIG. 8 shows schematically a structural schematic diagram of a browser for processing a password input box element according to an embodiment of the invention.

To solve the above technical problem, an embodiment of the invention provides a browser for process a password input box element. FIG. 8 shows schematically a structural schematic diagram of a browser for processing a password input box element according to an embodiment of the invention. The browser comprises at least one DOM object processing module 810 of a password input box element, a page parsing module 820, a DOM processing module 830 and a password input module 840. Now, the functions of each module comprised in the browser will be described in detail.

First, the at least one DOM object processing module 810 of a password input box element will be introduced. The number of the DOM object processing modules 810 is at least one, and they are disposed at the browser side beforehand, and each DOM object processing module 810 stores a customized processing of a password input box element. The number of the DOM object processing modules may be 1, or also may be 2, or also may be 3, 4, 5, or more, and the specific number is determined according to the number of DOM objects and the number of customized processing. In FIG. 8, it is set to be 3 for illustration.

Second, the page parsing module 820 will be introduced. When processing an obtained page, the page parsing module 820 loads the obtained page at the browser side. Considering that a page as well as a page element cannot be directly processed, therefore, the page parsing module 820 needs to parse a password input box element in the page and convert the password input box element into a DOM object for being subsequently processed by the DOM processing module 830.

Then, the DOM processor 830 will be introduced. Referring to FIG. 8, one end of the DOM processing module 830 is coupled to the page parsing module 820, and the other end is coupled to the at least one DOM object processing module 810 of a password box element pre-disposed at the browser side. After the parsing and conversion operations for a password box element are finished, the DOM processing module 830 will invoke at least one set DOM object processing module of a password input box element to perform a customized processing on a converted DOM object.

Finally, the password input module 840 will be introduced. Referring to FIG. 8, the password input module 840 is coupled to the DOM processing module 830. After the customized processing operation of the DOM processing module 830 is finished, the password input module 840 receives an input of the password content of a browser user in a password input box on which a customized processing is performed, which completes an initial input of the password. Further, after the input of the password content is finished, the password input module 840 writes the content in the password input box on which a customized processing is performed into the password input box element, thereby realizing the input of the password to the password input box element.

In the embodiment of the invention, for each DOM object parsed from a password input box element, a DOM object processing module for performing a customized processing on it is disposed at the network side, and in the procedure of obtaining a page, an invoked DOM object processing module is utilized to perform a customized processing on the DOM object. In this example, a password is not directly inputted into a password input box element, but first inputted into a password input box on which a customized processing is performed, and then written into the password input box element. If, for obtaining a user's password, malicious software and a Trojan, etc. are monitoring a password input box in a web page, when initially inputting the password, the password input box will not obtain the password content. Therefore, at this point, the monitoring cannot intercept the password. However, at the time of the input of the password to the password input box element, since the password is directly written by the browser at the moment, and is not inputted by a user externally, malicious software and a Trojan also cannot find and intercept the password. Therefore, employing the browser provided by the invention can prevent various malicious programs from intercepting a password, and improving the security of the system and the user's experience.

Preferably, the password input module 840 may further encrypt the password content according to a preset encryption algorithm, and then write the encrypted password content into the password input box element. As such, another layer of protection is added to the security of the password content, and even if a malicious program such as malicious software or a Trojan, etc. could still obtain the password from the password input box element, what is obtained by it is the encrypted password content, and it still can not obtain a valid password, which further improves the security of the system.

Referring to FIG. 8, the browser for processing a password input box element further comprises a saving module 850 coupled to the password input module 840. After the input of password content is finished, the saving module 850 can save the inputted password content at the browser side. Correspondingly, a password processing module 860 for processing a password input box element in the browser is coupled to the saving module 850. When an obtained page is loaded, the password processing module 860 can obtain the password content saved by the saving module 850 from the browser side, and then display the obtained password content in the password input box on which a customized processing is performed. When this example is implemented, since only the password content is obtained, it is not stated that a customized processing must have been performed on the password input box, that is, the password input box here may also be a password input box on which a customized processing is not performed. At this time, the password processing module 860 can write the obtained password content into the password input box on which a customized processing is not performed.

It is mentioned above that the DOM processing module 830 will invoke at least one DOM object processing module of a password input box element to perform a customized processing on a converted DOM object. Now, a specific processing way is provided. In this example, the DOM processing module 830 first obtains from a converted DOM object the position information of a password input box element on a page. Further, the DOM processing module 830 can generate an overlapped block level layer on the password input box element according to the obtained position information of the password input box element on the page. Then, on the block level layer, the DOM processing module 830 can invoke the at least one DOM object processor of a password input box element to perform a customized processing on a converted DOM object. After the block level layer is set, to improve the security of the system, the password input module 840 can hide the password input box element on the page and input the password to the block level layer. Since the original password input box element is hidden, for a malicious program which monitors the password input box element, the operations of monitoring a message of an object and then obtaining the password content received by the monitored object cannot be completed naturally, thereby achieving the goal of improving the security of the system.

When a password is inputted on the block level layer, the password input module 840 may employ a traditional way of inputting a password, namely, converting the password received by the block level layer into a specified identifier, and displaying the converted specified identifier on the page according to the conversion order.

In relevant techniques, a commonly used way of a malicious program monitoring a password input box element is to monitor the position of the focus, and if the focus appears in the password input box, it is likely that a user is inputting password content, and the password content may be stolen at the moment. To solve this technical problem, this example provides a solution, namely, the password input module 840 inputs the content received by the block level layer into the password input box element only when the block level layer overlapped on the password input box element loses the focus. For a malicious program, when the focus disappears, it will not monitor the password input box element any more, thereby improving the security of inputting a password. The focus is generally implemented by a cursor in a browser.

In any one preferred embodiment of the embodiments of the invention, the block level layer comprises a div layer.

Therein, for the operation of invoking a DOM object processing module 810, the DOM processing module 830 needs to know the address of each DOM object processing module 810, and then performs a corresponding invocation, and if there are many DOM object processing modules and their memory addresses are relatively scattered, it will be difficult for the DOM processing module 830 to invoke. Now, a preferred way of invocation is provided. In this example, an object processing registry is set, the register information of all the DOM object processing modules is registered in this table, and the register information here may comprises memory addresses of each DOM object processing module, the customization operation of each DOM object processing module, and whether it is being invoked, etc. Correspondingly, referring to FIG. 8, the browser for processing a page password box provided by the embodiment of the invention further comprises a query module 870. The query module 870 is coupled to the DOM processing module 830 and queries from the object processing registry about whether there is a DOM object processing module for processing a password box element in the browser. After the query is finished, the query module 870 notifies the DOM processing module 830 of the query result, and the DOM processing module 830 will invoke a corresponding DOM object processing module 810 according to the query result.

For each DOM object, there are at least two events, one is an event ContentReady triggered when the loading of the DOM object is finished, and the other is an event DocumentReady triggered when the loading of the whole HTML is finished. Since the embodiment of the invention relates to processing a password box element, it only involves the event ContentReady triggered when the loading of the DOM object is finished. Preferably, the at least DOM object processing module provided by the embodiment of the invention stores a processing way which specifies a processing of the event ContentReady triggered when the loading of the password box element is finished. Further, the at least DOM object processing module provided by the embodiment of the invention may also store a processing way of processing the event DocumentReady triggered when the loading of the whole HTML is finished.

Now, a case when an overlapped block level layer comprises a div layer will be set forth and illustrated in detail in a specific embodiment.

For a password input box element, a rendering engine of a web page browser comprises a specific processor (i.e., a DOM object processing module) for the password input box element, and the specific processor at least specifies a processing method for processing the event ContentReady triggered when the loading of a DOM object is finished.

When implemented, the DOM processing module 830 first obtains the position information of the password input box element. Then, the DOM processing module 830 overlaps a div layer on the area of the password input box element, and sets various attributes of the div layer. Since the div layer is overlapped on the password input box element, the div layer receives an interaction event beforehand and processes it. Further, the password input module 840 hides the position of the original password input box element, and sets the div layer to display inputted content in a traditional way of inputting a password when receiving a user's input. When the div loses the focus, the password input module 840 writes the content of the div layer into the password input box element.

The architecture of each part of the above described browser for processing a page text box is provided according to their functions, and a real architecture is not limited to the above parts, and may further comprise other parts, modules, appliances, etc.

Figure 9:
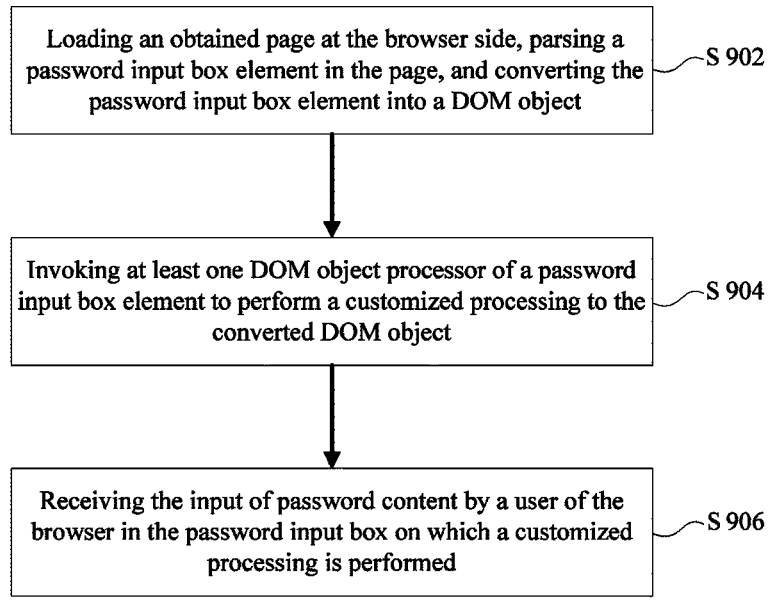
FIG. 9 shows schematically a processing flow chart of a method for a browser to process a password input box element according to an embodiment of the invention.

FIG. 9 shows schematically a processing flow chart of a method for a browser to process a password input box element according to an embodiment of the invention. In this example, at least one DOM object processor of a password input box element is disposed at the browser side, wherein each object processor stores a customized processing of a password input box element. The method comprises step S902 to step S908.

At step S902, an obtained page is loaded at the browser side, a password input box element in the obtained page is parsed, and the password input box element is converted into a DOM object.

At step S904, at least one DOM object processor of a password input box element is invoked to perform a customized processing on the converted DOM object.

At step S906, the input of password content by a user of the browser is received in the password input box on which a customized processing is performed.

At step S908, after the input of the password content is finished, the content in the password input box on which a customized processing is performed is written into the password input box element.

In the embodiment of the invention, for each DOM object parsed from a password input box element, a DOM object processing module for performing a customized processing on it is disposed at the network side, and in the procedure of obtaining a page, an invoked DOM object processor is utilized to perform a customized processing on the DOM object. In this example, a password is not directly inputted into a password input box element, but first inputted into a password input box on which a customized processing is performed, and then written into the password input box element. If, for obtaining a user's password, malicious software and a Trojan, etc. are monitoring a password input box in a web page, when initially inputting the password, the password input box will not obtain the password content. Therefore, at this point, the monitoring cannot intercept the password. However, at the time of the input of the password to the password input box element, since the password is directly written by the browser at the moment, and is not inputted by a user externally, malicious software and a Trojan also cannot find and intercept the password. Therefore, employing the browser provided by the invention can prevent various malicious programs from intercepting a password, and improving the security of the system and the user's experience.

It needs to be noted that the function of the DOM object processor in this flow is similar to that of the DOM object processing module mentioned above, and since the above is related to the architecture of a browser, it is referred to as a DOM object processing module. However, in this flow, only one component, i.e., the DOM object processor, is involved, and therefore, it is not needed to be called a module, which will not be repeated hereinafter.

Referring to FIG. 9, when step S908 is implemented, it is mentioned that the content in the password input box on which a customized processing is performed is written into the password input box element. Preferably, the password content can be encrypted according to a preset encryption algorithm, and then the encrypted password content is written into the password input box element. After encryption, even if a malicious program obtains the password content, if it cannot obtain the corresponding encryption algorithm at the same time, the password content is also invalid, which improves the security of the system.

Referring to the flow as shown in FIG. 9, after the input of password content is finished, the inputted password content may further be saved at the browser side. Afterwards, when an obtained page is loaded, the saved password content can be obtained directly from the browser side, and further the obtained password content is displayed in the password input box on which a customized processing is performed. Of course, if a customized processing is not performed to the password input box, the obtained password content may be directly written into the password input box on which a customized processing is not performed.

Further, when a submission event is received, a subsequent operation can be triggered to write the content in the password input box on which a customized processing is performed into the password input box element, and submit the password content to the network side.

Figure 10:
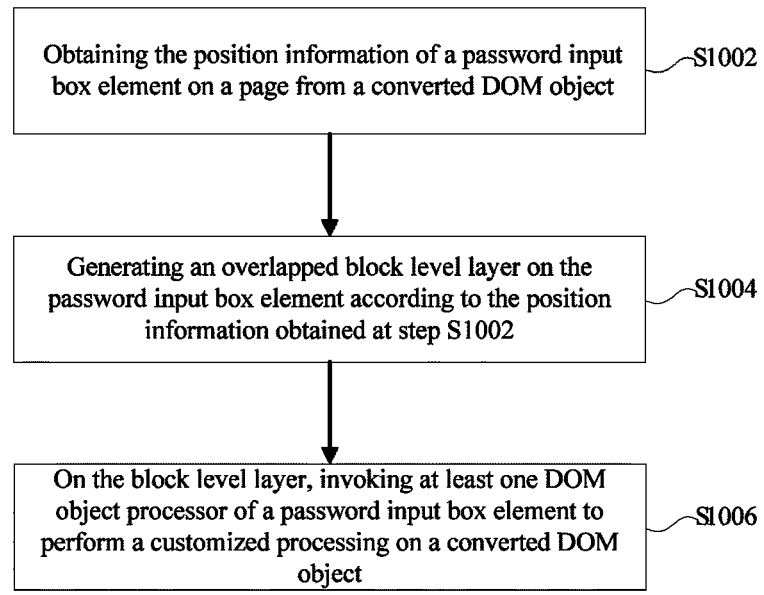
FIG. 10 shows schematically a processing flow chart of performing a customized processing according to an embodiment of the invention.

In the flow as shown in FIG. 9, it is mentioned in step S904 that at least one DOM object processor of a password input box element is invoked to perform a customized processing on the converted DOM object, and its specific processing flow is as shown in FIG. 10, comprising step S1002 to step S1006.

At step S1002, the position information of a password input box element on a page is obtained from a converted DOM object.

At step S1004, an overlapped block level layer is generated on the password input box element according to the position information obtained at step S1002.

At step S1006, on the block level layer, at least one DOM object processor of a password input box element is invoked to perform a customized processing on a converted DOM object.

It is mentioned above that the password is inputted into the password input box on which a customized processing is performed. Preferably, the password input box element can be hidden and further the password is inputted to the block level layer. Since the original password input box element is hidden, for a malicious program which monitors the password input box element, the operations of monitoring a message of an object and then obtaining the password content received by the monitored object cannot be completed naturally, thereby achieving the goal of improving the security of the system.

When a password is inputted on the block level layer, the password input module 840 can employ a traditional way of inputting a password, namely, converting the password received by the block level layer into a specified identifier, and displaying the converted specified identifier on the page according to the conversion order.

In relevant techniques, a commonly used way of a malicious program monitoring a password input box element is to monitor the position of the focus, and if the focus appears in the password input box, it is likely that a user is inputting password content, and the password content may be stolen at the moment. To solve this technical problem, this example provides a solution, namely, the password input module 840 inputs the content received by the block level layer into the password input box element only when the block level layer overlapped on the password input box element loses the focus. For a malicious program, when the focus disappears, it will not monitor the password input box element any more, thereby improving the security of inputting a password. The focus is generally implemented by a cursor in a browser.

In any preferred embodiment of the embodiments of the invention, the block level layer comprises a div layer.

Therein, for the operation of invoking a DOM object processor, it is needed to know the address of each DOM object processor, and then a corresponding invocation is performed, and if there are many DOM object processors and their memory addresses are relatively scattered, it is difficult to invoke them. Now, a preferred way of invocation is provided. In this example, an object processing registry is set, the register information of all the DOM object processors is registered in this table, and the register information here may comprises memory addresses of each DOM object processor, the customization operation of each DOM object processor, and whether it is being invoked, etc. Correspondingly, referring to FIG. 8, the browser for processing a page password box provided by the embodiment of the invention queries from the object processing registry about whether there is a DOM object processor for processing a password box element in the browser. After the query is finished, a corresponding DOM object processor will be invoked according to the query result.

For each DOM object, there are at least two events, one is an event ContentReady triggered when the loading of the DOM object is finished, and the other is an event DocumentReady triggered when the loading of the whole HTML is finished. Since the embodiment of the invention relates to processing a password box element, it only involves the event ContentReady triggered when the loading of the DOM object is finished. Preferably, the at least DOM object processor provided by the embodiment of the invention stores a processing way which specifies a processing of the event ContentReady triggered when the loading of the password box element is finished. Further, the at least DOM object processing module provided by the embodiment of the invention may also stores a processing way of processing the event DocumentReady triggered when the loading of the whole HTML is finished.

First Embodiment

For the browser mentioned in the embodiments of the invention, there are many kinds, for example, Internet Explorer (IE for short) and Mozilla Firefox of Microsoft Corporation, Chrome and Opera of Google Corporation, and Safari of Apple Inc., etc.

Now, the browser IE is taken as an example to set forth and illustrate in detail a specific method for processing a text box element provided by an embodiment of the invention.

For a specific processing with respect to each web page element, the following may be required to be implemented:

IElementBehavior (element behavior)

Implementing the IElementBehavior Interface (interface for implementing an element behavior)

Implementing the Notify Method (method for implementing a notification)

Implementing the Init Method (method for implementing initialization)

Implementing the Detach Method (method for implementing detachment)

IElementBehaviorFactory (element behavior factory behavior)

IElementNamespaceFactory (element namespace factory interface)

IElementNamespaceFactoryCallback (element namespace callback interface)

After an initialization is set, the specific steps for processing a web page element implemented by the client plug-in WebBrowser (a network browser) in the browser IE are as follows.

At step 1, the client plug-in WebBrowser implements interface IElementBehaviorFactory and the interface IElementBehavior.

At step 2, the client plug-in WebBrowser implements the interface IDocHostUIHandler.

Note that the plug-in WebBrowser here is a particular implementation of a specific processor with respect to a specific DOM object in IE, implements the interface IDocHostUIHandler for registering the specific processor into the object registry for being employed by the DOM processor, and implements the interfaces IElementBehaviorFactory and IElementBehavior for illustrating the implementation of a particular customized processing.

At step 3, when a page is created, MSHTML will invoke the GetHostInfo method of IDocHostUIHandler, and a client program will provide a TAG of a page element and a corresponding Behavior Name to MSHTML.

Note: MSHTML corresponds to a core engine, and this step corresponds to the DOM processor querying a list of all the DOM object processors.

At step 4, when a page is loaded, MSHTML will, according to the Behavior Name provided above, invoke the FindBehavior method of IElementBehaviorFactory one by one, which is implemented by the interface IElementBehavior with respect to DIV_PSW provided by the client.

Here, preferably, it is associated with a corresponding interface IElementBehaviorSite provided by the page to determine whether it is a customized behavior.

At step 5, if the client provides input typ=password, when loading a page element corresponding to the TAG, MSHTML will invoke the element behavior notification method for inputting a password to notify the client of the loaded state of the page element.

Note: the implementation of the element behavior notification method in IE may utilize IElementBehavior::Notify.

When the attribute CONTENTEDITABLE is open, div can receive a keyboard input, OnKeyDown is implemented by a client program, an inputted character is recorded in the customized attribute pswText of div, and the innerText of div is set to be "*". When the event onblur of div is triggered, the value of pswText is written back to input typ=password.

Therein, it is worth noting that step 4 and step 5 correspond to the processing module invoking a corresponding DOM object processor to process a DOM object.

The method of the embodiment is not limited to the browser IE, and for other browsers, the implementations thereof are similar.

Second Embodiment

What is described above is to directly process a password input box element. As is well known, there are many kinds of page elements, the browser needs to convert and process each page element, and then render the processed page element so as to generate a presented web page.

Figure 11:
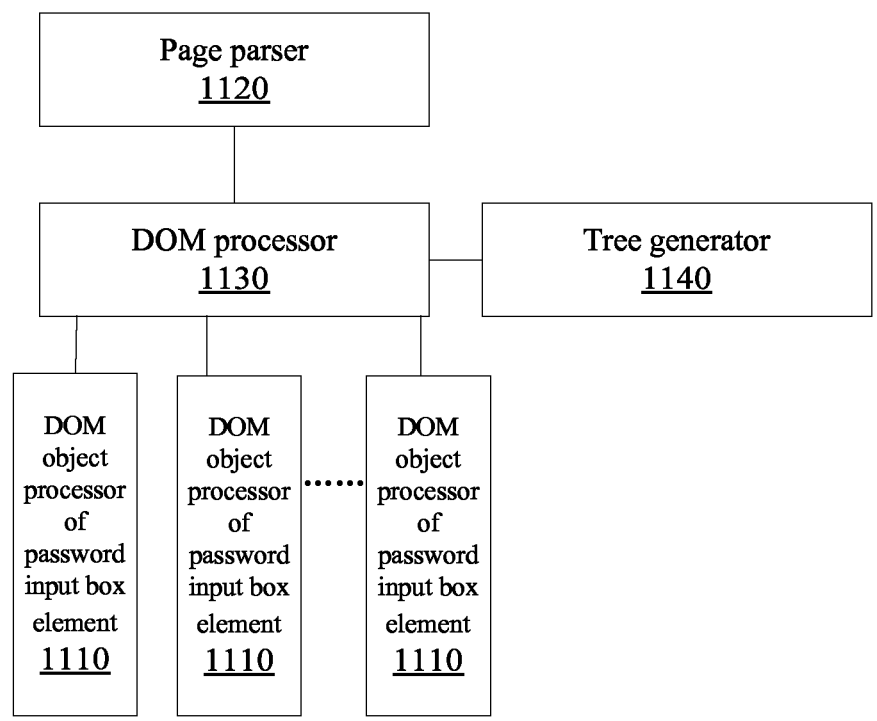
FIG. 11 shows schematically a structural schematic diagram of a browser for processing a page element according to an embodiment of the invention.

FIG. 11 shows schematically a structural schematic diagram of a browser for processing a page element according to an embodiment of the invention. Referring to FIG. 11, the browser comprises at least one DOM object processor 1110 disposed at the browser side, a page parser 1120 and a DOM processor 1130.

Therein, there is comprised at least one DOM object processor 1110, which is disposed at the browser side in advance, and each DOM object processor 1110 stores a customized processing of a specific DOM object. The number of the DOM object processors may be 1, or also may be 2, or also may be 3, 4, 5 or more, and the specific number is determined according to the number of DOM objects and the number of customized processing. In FIG. 11, for illustration, the number is set to be 3.

When processing an obtained page, the page parser 1120 loads the obtained page at the browser side, parses page elements of the obtained page. Considering that a page and a page element cannot be processed directly, therefore, the page parser 1120 converts each page element into a DOM object during parsing for being processed by the DOM processor 1130 subsequently.

Referring to FIG. 11, the DOM processor 1130 is coupled to the page parser 1120 and the at least DOM object processor 1110. After the parsing of the page parser 1120 is finished, the DOM processor 1130 is started. The DOM processor 1130 selects at least one of converted DOM objects as the DOM object currently prepared to be processed, invokes the at least one DOM object processor 1110 to perform a customized processing on the selected DOM object.

Referring to FIG. 11, the browser further comprises a tree generator 1140 coupled to the DOM processor 1130. After the DOM processor 1130 invokes a DOM object processor 1110 to perform a customized processing on a DOM object, the tree generator 1140 utilizes DOM objects on which a customized processing is performed to generate a final DOM tree and render the DOM tree.

However, the password input box element is one of the page elements, and therefore, when the page element is a password input box element, a device for utilizing a browser to process a page element may directly process the password input box element, only the customized processing way stored in its selected DOM object processor is directed to a customized processing of a password input box element. That is, in this example, referring to FIG. 11, its selected DOM object processor 1110 should be a DOM object processor 1110 of a password input box element. The functions of other individual components remain unchanged.

In this example, the function of the page parser 1120 is similar to that of the page parsing module 820 in a previous embodiment, and both functions are to convert a corresponding element into a DOM object. And the DOM processor 1130 is similar to the DOM processing module 830 in the previous embodiment in terms of function, which invokes a corresponding DOM object processing module (or a DOM object processor) to perform a corresponding processing on a current DOM object.

Employing the browser provided by the invention and its corresponding processing method, the following beneficial effects can be achieved:

In the embodiment of the invention, for each DOM object parsed from a password input box element, a DOM object processing module for performing a customized processing on it is disposed at the network side, and in the procedure of obtaining a page, an invoked DOM object processing module is utilized to perform a customized processing on the DOM object. In this example, a password is not directly inputted into a password input box element, but first inputted into a password input box on which a customized processing is performed, and then written into the password input box element. If, for obtaining a user's password, malicious software and a Trojan, etc. are monitoring a password input box in a web page, when initially inputting of the password, the password input box will not obtain the password content. Therefore, at this point, the monitoring cannot intercept the password. However, at the time of the input of the password to the password input box element, since the password is directly written by the browser at the moment, and is not inputted by a user externally, malicious software and a Trojan also cannot find and intercept the password. Therefore, employing the browser provided by the invention can prevent various malicious programs from intercepting a password, and improving the security of the system and the user's experience.

The algorithms and displays provided here are not inherently related to any specific computer, virtual system or other apparatus. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

For a device embodiment, it is described relatively simply due to its substantial similarity to a corresponding method embodiment, and as for its relevant parts reference may be made to the description of the parts of the method embodiment.

Each embodiment in the specification are described using a progressive manner, each embodiment highlights its difference from other embodiments, and identical or similar parts of each embodiment may be referred relative to each other.

Embodiments of the individual components of the invention may be implemented in hardware, or in a software module running on one or more processors, or in a combination thereof. It will be appreciated by those skilled in the art that, in practice, some or all of the functions of some or all of the components in a user terminal device for a browser to process a page element according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 12:
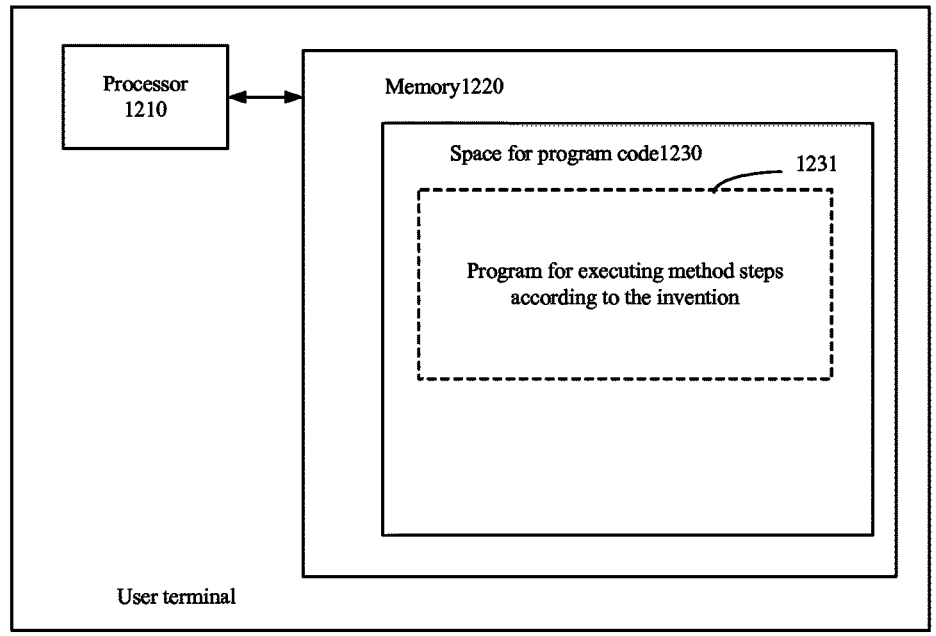
FIG. 12 shows schematically a block diagram of a user terminal for performing a method according to the invention.
Figure 13:
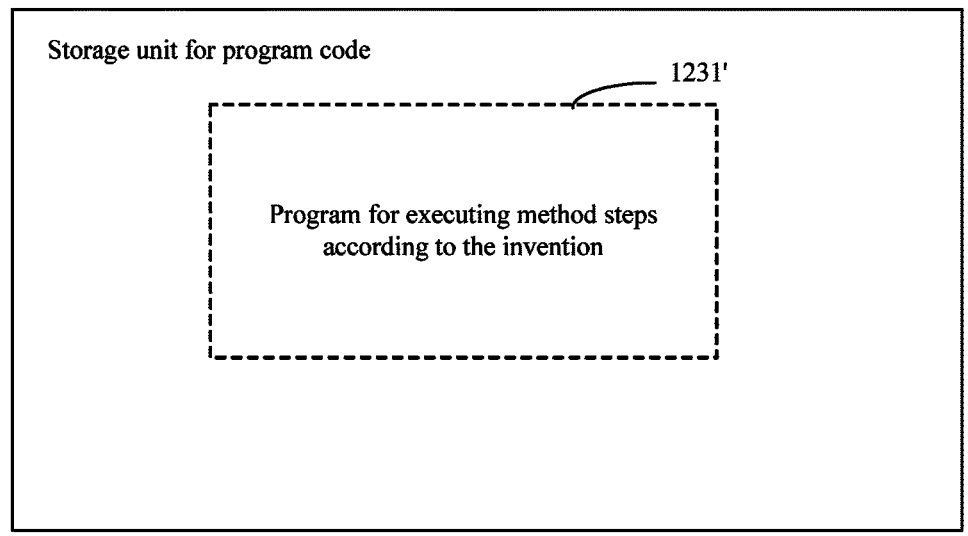
FIG. 13 shows schematically a storage unit for retaining or carrying a program code implementing a method according to the invention.

For example, FIG. 12 shows schematically a user terminal which may carry out a method for a browser to process a page element according to the invention. The user terminal traditionally comprises a processor 1210 and a computer program product or a computer readable medium in the form of a memory 1220. The memory 1220 may be an electronic memory such as a flash memory, an EEPROM (electrically erasable programmable read-only memory), an EPROM, a hard disk or a ROM. The memory 1220 has a memory space 1230 for a program code 1231 for carrying out any method steps in the methods as described above. For example, the memory space 1230 for a program code may comprise any program code 1231 for carrying out any step in the above methods, respectively. The program codes may be read out from or written to one or more computer program product. These computer program products comprise a program code carrier such as a hard disk, a compact disk (CD), a memory card or a floppy disk and so on. Such a computer program product is generally a portable or stationary storage unit as described with reference to FIG. 13. The storage unit may have a memory segment, a memory space, etc. arranged similarly to the memory 1220 in the user terminal of FIG. 12. The program code may for example be compressed in an appropriate form. In general, the storage unit comprises a computer readable code 1231', i.e., a code which may be read by e.g., a processor such as 1210, and when run by a user terminal, the codes cause the user terminal to carry out each step in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A computing device having a browser to process a page element, the computing device comprising:
at least one processor to:
load an obtained page by the browser, parse page elements of the obtained page, and convert each page element into a DOM object, the obtained page comprising at least one DOM object;
invoke at least one DOM object processor to perform a customized processing on the at least one DOM object and store the at least one DOM object as at least one customized processed DOM object; and
generate a DOM tree and render the DOM tree utilizing the at least one customized processed DOM object.

2. The computing device according to claim 1, the at least one processor further to query an object processing registry to determine whether there is a DOM object processor for processing a current DOM object, wherein the object processing registry includes register information of the at least one DOM object processor; and
when there is the DOM object processor for processing the current DOM object, find the DOM object processor for processing the DOM object according to the register information and invoke the DOM object processor.

3. The computing device according to claim 1, the at least one processor further to invoke the DOM object processor to perform the customized processing on the DOM object, when the DOM object processor for processing the current DOM object exists; and
perform a default processing on the DOM object when the DOM object processor for processing the current DOM object does not exist.

4. The computing device according to claim 1, the at least one processor further to process an event ContentReady triggered when loading of a specific DOM object is finished and process an event DocumentReady triggered when loading of all HTML of the obtained page is finished.

5. The computing device according to claim 1, the at least one processor further to invoke the at least one DOM object processor through an interface provided by the browser for rendering a web page element.

6. The computing device according to claim 5, wherein the at least one DOM object comprises at least one of a text box element and a password input box element.

7. A method for a computing device having a browser to process a page element, at least one DOM object processor at the computing device, wherein each DOM object processor stores a customized processed specific DOM object, the method comprising:
loading, by at least one processor, an obtained page at the browser, parsing page elements of the obtained page, and converting each page element into a DOM object;
invoking, by the at least one processor, the at least one DOM object processor to perform the customized processing on at least one DOM object and store the at least one DOM object as at least one customized processed DOM object;
utilizing the at least one customized processed DOM object to generate, by the at least one processor, a DOM tree; and
rendering, by the at least one processor, the DOM tree.

8. The method according to claim 7, wherein invoking the at least one DOM object processor further comprises:
querying an object processing registry to determine whether there is a DOM object processor for processing a current DOM object, wherein the object processing registry includes register information of the at least one DOM object processor; and
when there is the DOM object processor for processing the current DOM object, finding the DOM object processor for processing the DOM object according to the registered information and invoking the DOM object processor.

9. The method according to claim 8, wherein, when the browser is Internet Explorer the browser disposes a first interface IElementBehaviorFactory, a second interface IElementBehavior, and a third interface IDocHostUIHandler in a plug-in WebBrowser, wherein the first interface and the second interface invoke each DOM object processor, and the third interface is registers each DOM object processor to the object processing registry; and
invoking the at least one DOM object processor comprises:
according to a behavior name BehaviorName provided by the computing device, a core engine invokes the at least one DOM object processor connected with the first interface via the second interface; and
when loading a corresponding page element according to a page element identification TAG provided by the client computing device, the core engine invokes an element behavior notification method to notify the computing device of a loading state of the page element.

10. The method according to claim 9, wherein the core engine invoking the at least one DOM object processor further comprises:
the core engine is associated with a fourth interface IElementBehaviorSite provided by the obtained page, and determining via the fourth interface whether the current DOM object has a customized processing.

11. The method according to claim 7, wherein invoking the at least one DOM object processor to perform the customized processing on the at least one DOM object further comprises:
when the DOM object processor for processing the current DOM object exists, invoking the DOM object processor to perform the customized processing on the DOM object; and
when the DOM object processor for processing the current DOM object does not exist, performing a default processing on the DOM object.

12. The method according to claim 7, wherein each DOM object processor processes an event ContentReady triggered when the loading of the specific DOM object is finished and processes an event DocumentReady triggered when the loading of all HTML of the obtained page is finished.

13. The method according to claim 7, wherein the DOM object comprises at least one of a text box element and a password input box element.

14. The method according to claim 13, wherein invoking the at least one DOM object processor to perform the customized processing on the least one DOM object comprises:
obtaining position information of a text box element or password input box element on a browser page from the at least one DOM object;

generating an overlapped block level layer on the text box element or password input box element according to the position information; and on the overlapped block level layer, invoking the at least one DOM object processing of a text box element or password input box element to perform the customized processing on at least one text box element or password input box element in the at least one DOM object.

15. The method according to claim 13, further comprising:

displaying a result of the customized processing on the text box element or password input box element in the obtained page.

16. A non-transitory computer readable medium having instructions stored thereon that, when executed by at least one processor, cause the at least one processor to perform operations for a computing device having a browser to process a page element, at least one DOM object processor at the computing device, wherein each DOM object processor stores a customized processed specific DOM object, the operations comprising:

loading an obtained page by the browser, parsing page elements of the obtained page, and converting each page element into a DOM object;

invoking the at least one DOM object processor to perform the customized processing on at least one DOM object and store the at least one DOM object as at least one customized processed DOM object;

utilizing the at least one customized processed DOM object to generate a DOM tree; and rendering the DOM tree.

* * * * *